(12) United States Patent
Guenter et al.

(10) Patent No.: US 9,569,710 B1
(45) Date of Patent: Feb. 14, 2017

(54) ENCODING AND DECODING DATA IN TWO-DIMENSIONAL SYMBOLOGY

(71) Applicant: International Business Machines Corporation, Armonk, NY (US)

(72) Inventors: Erich Guenter, Hofheim (DE); Mark E. Maresh, Wake Forest, NC (US); Colm Nolan, Meath (IR); Juan F. Vargas, Rochester, MN (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,510

(22) Filed: Dec. 14, 2015

(51) Int. Cl.
*G06K 19/06* (2006.01)

(52) U.S. Cl.
CPC ................. *G06K 19/06037* (2013.01)

(58) Field of Classification Search
CPC .............. G06K 19/06037; G06K 19/06093; G06K 19/06103
USPC ................................................. 235/494, 487
See application file for complete search history.

(56) References Cited

U.S. PATENT DOCUMENTS

| | | | |
|---|---|---|---|
| 6,791,714 B1 | 9/2004 | Ishimura | |
| 7,483,585 B2 * | 1/2009 | Brakus, Jr. | H04N 1/419 382/232 |
| 7,565,023 B2 | 7/2009 | Hwang et al. | |
| 7,889,925 B2 | 2/2011 | Topper | |
| 7,936,901 B2 | 5/2011 | Jancke | |
| 8,011,596 B2 | 9/2011 | Longacre, Jr. | |
| 8,162,222 B2 | 4/2012 | Krichi et al. | |
| 8,300,882 B2 | 10/2012 | Das Gupta et al. | |
| 2006/0242562 A1 | 10/2006 | Wang et al. | |
| 2008/0143762 A1 * | 6/2008 | Obrea | B41J 3/51 347/6 |
| 2009/0208912 A1 | 8/2009 | Voigt | |
| 2013/0301870 A1 * | 11/2013 | Mow | G06T 1/0021 382/100 |

(Continued)

OTHER PUBLICATIONS

Anonymously, "Method for Encoding Multiple Symbols on Stoppers", IP.com Prior Art DataBase Technical Disclosure, May 14, 2015, pp. 1-5.

(Continued)

*Primary Examiner* — Paultep Savusdiphol
(74) *Attorney, Agent, or Firm* — Cantor Colburn LLP; Damion Josephs (57) ABSTRACT

Examples of techniques for encoding data in a 2D symbology are disclosed. In one example implementation according to aspects of the present disclosure, a computer-implemented method includes assigning a first data symbol representative of a 0-bit and a second data symbol representative of a 1-bit, each of the first data symbol and the second data symbol include a line segment. The method further includes designating a starting indicator and an ending indicator. The method also includes generating, by a processing device, the 2D symbology. The 2D symbology includes a series of data symbols representing a binary string. Each data symbol in the series of data symbols are positioned in an end-to-end orientation starting at the starting indicator and ending at the ending indicator. The series of data symbols include 0-bit symbols represented by the first data symbol and 1-bit symbols represented by the second data symbol.

18 Claims, 7 Drawing Sheets

(56) References Cited

U.S. PATENT DOCUMENTS

2015/0213330 A1* 7/2015 Chulinin ............ G06F 17/2863
  382/185

OTHER PUBLICATIONS

N. Brady, et al.,"Context-based Arithmetic Encoding of 2D Shape Sequences", Image Processings, IEEE International Conference vol. 31, Oct. 26-29, 1997, pp. 1-4.

* cited by examiner

ENCODING AND DECODING DATA IN TWO-DIMENSIONAL SYMBOLOGY

BACKGROUND

The present disclosure relates to two-dimensional (2D) symbology, and more particularly, relates to techniques for encoding and decoding data in two-dimensional symbology.

A 2D symbology is a two-dimensional representation of information. A 2D symbology (e.g., Data Matrix codes) can be read by an imaging device (such as a camera, scanner, etc.) and information contained within the 2D symbology can be decoded. Some current 2D symbologies encode data that is readable and decodable by processing systems but most existing 2D symbologies are not able to convey useful information to a human without being decoded by the processing system. In addition, some current 2D symbologies have rigid spatial, size, orientation, and/or layout requirements, providing little flexibility in their presentation. Examples of some existing 2D symbologies include Data Matrix codes, Quick Response (QR) codes, Aztec codes, Semacodes, PDF417 codes, and various other matrix codes.

SUMMARY

In accordance with aspects of the present disclosure, a computer-implemented method for encoding data in a 2D symbology is provided. The method comprises assigning a first data symbol representative of a 0-bit and a second data symbol representative of a 1-bit, each of the first data symbol and the second data symbol comprising a line segment. The method further comprises designating a starting indicator and an ending indicator. The method also comprises generating, by a processing device, the 2D symbology. The 2D symbology comprising a series of data symbols representing a binary string. Each data symbol in the series of data symbols are positioned in an end-to-end orientation starting at the starting indicator and ending at the ending indicator. The series of data symbols comprise 0-bit symbols represented by the first data symbol and 1-bit symbols represented by the second data symbol.

In accordance with additional aspects of the present disclosure, a system for encoding data in a 2D symbology is provided. The system comprises a processor in communication with one or more types of memory. The processor is configured to assign a first data symbol representative of a 0-bit and a second data symbol representative of a 1-bit, each of the first data symbol and the second data symbol comprising a line segment. The processor is further configured to designate a starting indicator and an ending indicator. The processor is also configured to generate the 2D symbology, the 2D symbology comprising a series of data symbols representing a binary string, wherein each data symbol in the series of data symbols are positioned in an end-to-end orientation starting at the starting indicator and ending at the ending indicator, and wherein the series of data symbols comprise 0-bit symbols represented by the first data symbol and 1-bit symbols represented by the second data symbol.

In accordance with yet additional aspects of the present disclosure, a computer program product for encoding data in a 2D symbology is provided. The computer program product comprises a non-transitory storage medium readable by a processing circuit and storing instructions for execution by the processing circuit for performing a method. The method comprises assigning a first data symbol representative of a 0-bit and a second data symbol representative of a 1-bit, each of the first data symbol and the second data symbol comprising a line segment. The method further comprises designating a starting indicator and an ending indicator. The method also comprises generating the 2D symbology. The 2D symbology comprising a series of data symbols representing a binary string. Each data symbol in the series of data symbols are positioned in an end-to-end orientation starting at the starting indicator and ending at the ending indicator. The series of data symbols comprise 0-bit symbols represented by the first data symbol and 1-bit symbols represented by the second data symbol.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of encoding and decoding data in two-dimensional (2D) symbologies. To encode and decode data in a 2D symbology, the present techniques utilize data symbols to represent bits of a binary string. In examples, the data symbols are a circle on a line segment. An empty circle on a line segment may represent a 0-bit and a solid circle on a line segment may represent a 1-bit. The data symbols are placed in an end-to-end orientation to form line in a sequence corresponding to the bits of the binary string. The line begins at a starting indicator and ends at an ending indicator and may be of any suitable shape and length. In examples, the line is segmented into segments, and connector pairs are used to indicate the sequence. Other types of indicators (i.e., operational symbols) may be implemented within a sequence of data bits in a segment to provide logical and/or mathematical functionality to the segment.

In some implementations, the present techniques enable 2D symbology to be flexible in terms of spatial, size, orientation, and/or layout specifications. Moreover, the present techniques may enable a 2D symbology to be human-recognizable (e.g., text, a logo, a symbol, etc.). These and other advantages will be apparent from the description that follows.

Figure 1:
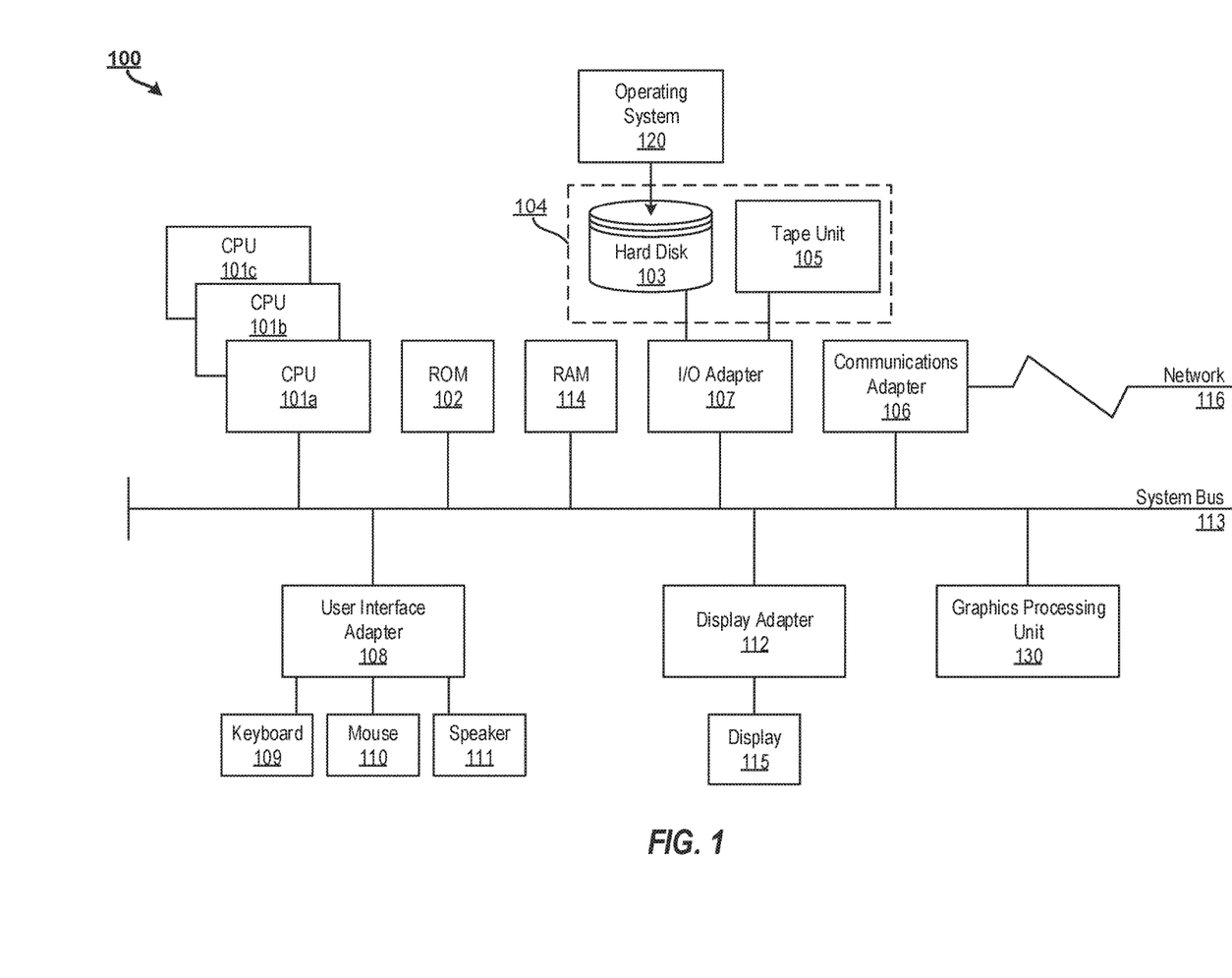
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
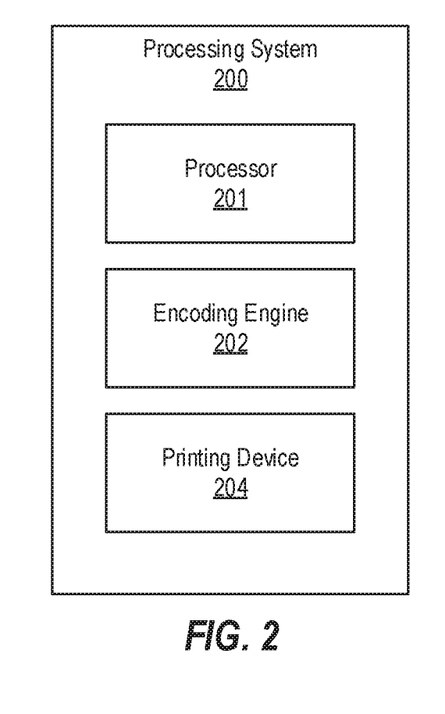
FIG. 2 illustrates a processing system for encoding data in two-dimensional symbology according to examples of the present disclosure.

FIG. 2 illustrates a processing system 200 for encoding data in two-dimensional symbology according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, an encoding engine 202, and a printing device 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Encoding engine 202 enables processing system 200 to encode data into a 2D symbology by assigning a first data symbol to represent a 0-bit of a binary string and a second data symbol to represent a 1-bit of the binary string. In examples, the first data symbol representative of a 0-bit is an empty circle on a line segment, and the second data symbol representative of a 1-bit is a solid circle on a line segment. In other examples, other shapes or symbols may be used, such as a triangle, square, oval, hexagon, etc.

Figure 4:
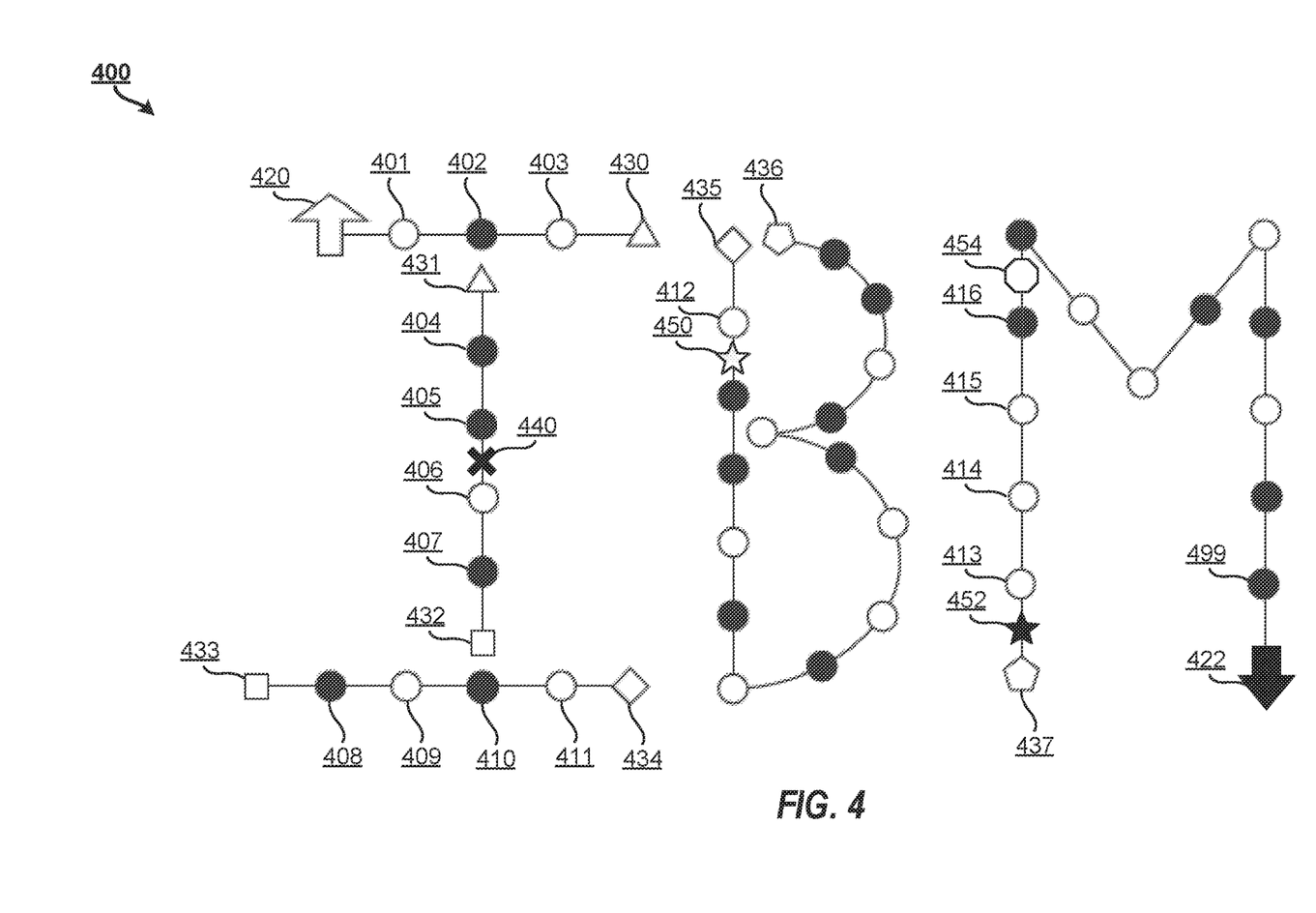
FIG. 4 illustrates a two-dimensional symbology according to examples of the present disclosure.

Encoding engine 202 also designates a starting indicator and an ending indicator. The starting indicator may be any suitable symbol, such as an arrow, a geometric shape, or other suitable symbol. The ending indicator comprises a symbol different from the starting indicator. In an example, as illustrated in FIG. 4, an up arrow may be designated as the starting indicator and a down arrow may be designated as the ending indicator. Other configurations of starting indicators and ending indicators may be utilized.

Encoding engine 202 generates the 2D symbology, which comprises a series of data symbols representing a binary string. The series of data symbols are positioned in an end-to-end orientation such that an end of a line segment of one data symbol joins an end of a line segment of another data symbol. The series of data symbols start at the starting indicator and end at the ending indicator. The series of data symbols comprise 0-bit symbols represented by the first data symbol and 1-bit symbols represented by the second data symbol.

Printing device 204 prints the 2D symbology generated by encoding engine 202. For example printing device 204 may be a printer or other image creation device configured to print or otherwise display the 2D symbology. In examples, printing device 204 is a printer configured to print the 2D symbology on a physical medium such as paper. In other examples, printing device 204 is an electronic display configured to display the 2D symbology electronically.

Figure 3:
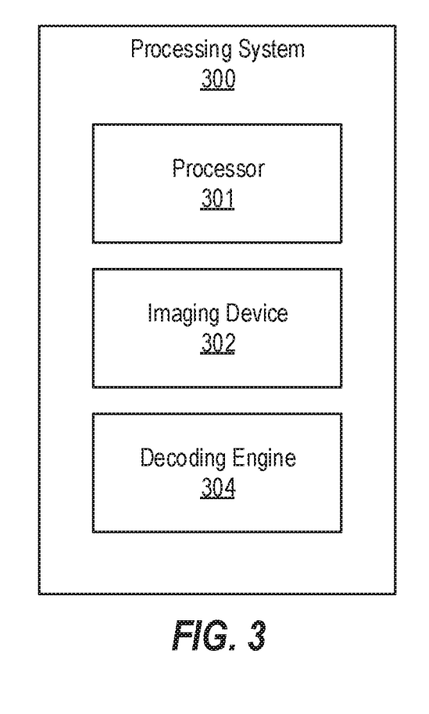
FIG. 3 illustrates a processing system for decoding data in two-dimensional symbology according to examples of the present disclosure.

FIG. 3 illustrates a processing system 300 for decoding data in two-dimensional symbology according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 300 may include a processor 301, an imaging device 302, and a decoding engine 304. Alternatively or additionally, the processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Imaging device 302 captures an image of a 2D symbology. The 2D symbology comprises a series of data symbols representing a binary string starting with a starting indicator and ending with an ending indicator. The series of data symbols comprise first data symbols representing a 0-bit and second data symbols representing a 1-bit. The data symbols comprise a line segment. The series of data symbols are positioned in an end-to-end orientation starting at a starting indicator and ending at an ending indicator. In examples, the imaging device 302 is a camera, scanner, or other device configured to capture an image, such as of a 2D symbology.

Decoding engine 304 recognizes the starting indicator and the ending indicator. The various examples of starting and ending indicators are disclosed herein.

Decoding engine 304 then extracts the binary string from the 2D symbology by reading each of the data symbols between the starting indicator and the ending indicator. In examples, once the starting indicator is recognized, the 2D symbology may be read by decoding engine 304. In particular, decoding engine 304 reads each of the data symbols after the starting indicator until decoding engine 304 reaches the ending indicator.

FIG. 4 illustrates a two-dimensional symbology 400 according to examples of the present disclosure. Starting indicator 420 (e.g., an empty arrow) indicates the start of the 2D symbology 400. Each of the data symbols following starting indicator 420 represent bits of a binary string. In the present example of FIG. 4, the 2D symbology 400 starts at starting indicator 420 and ends at ending indicator 422 (e.g., a solid arrow). In examples, a first data symbol representative of a 0-bit is an empty circle on a line segment, and a second data symbol representative of a 1-bit is a solid circle on a line segment. In other examples, other shapes or symbols may be used, such as a triangle, square, oval, hexagon, etc. and the line of the data symbol can vary in length and shape.

In the present example, 2D symbology 400 is broken into five segments using connector pairs. A connector pair comprises two connector symbols which indicate the ending of one segment and the start of the next segment. Connector symbols of a connector pair share a common symbol. For example, connector symbol 430 (a triangle) indicates the end of one segment and connector symbol 431 (also a triangle) indicates the start of the next segment. Similarly, connector symbol 436 (a pentagon) indicates the end of one segment and connector symbol 437 (also a pentagon) indicates the start of the next segment. In this way, 2D symbology 400 can be encoded in segments and the segments can be decoded and pieced back together in order based on the connector pairs. This enables the segments to be non-contiguous.

In the example of 2D symbology 400 of FIG. 4, the first segment starts at starting indicator 420 and ends at connector symbol 430. The second segment starts at connector symbol 431 and ends at connector symbol 432. The third segment starts at connector symbol 433 and ends at connector symbol 434. The fourth segment starts at connector symbol 435 and ends at connector symbol 436. The fifth segment starts at connector symbol 437 and ends at ending indicator 422.

The first segment of 2D symbology 400, starting at starting indicator 420, includes three data symbols: data symbol 401 represents a 0-bit, data symbol 402 represents a 1-bit, and data symbol 403 represents a 0-bit. Connector 430 indicates the end of segment. The first segment ends at connector 430. In this example, the first segment represents the binary string (or portion of a binary string) 010.

The second segment of 2D symbology 400, starting at connector symbol 431, includes four data symbols: data symbol 404 represents a 1-bit, data symbol 405 represents a 1-bit, data symbol 406 represents a 0-bit, and data symbol 407 represents a 1-bit. Connector 432 indicates the end of segment. The second segment ends at connector 432. In this example, the second segment represents the following portion of the binary string: 1101. In the example illustrated in FIG. 4, the second segment of 2D symbology 400 includes an operational symbol 440. An operational symbol may indicate a logical functions and operations to be performed when the binary string is decoded. For example, an operational symbol may indicate that an XOR operation, an AND operation, a NOR operation, or any other suitable operation is to be performed. Additionally, the operational symbol may indicate that a mathematical operation, such as addition, subtraction, multiplication, and/or division be performed. In the present example, operational symbol 440 represents an AND logical operation. In this case, an AND operation is performed on the first two data symbols (i.e., data symbols 404, 405) of the second segment which represent 1-1 and the second two data symbols (i.e., data symbols 406, 407) which represent 0-1. The result of the AND operation is 1-1, meaning that the second segment has a value of 1-1.

The third segment of 2D symbology 400, starting at connector symbol 433, includes four data symbols: data symbol 408 represents a 1-bit, data symbol 409 represents a 0-bit, data symbol 410 represents a 1-bit, and data symbol 411 represents a 0-bit. Connector 434 indicates the end of segment. The third segment ends at connector 434. In this example, the third segment represents the following portion of the binary string: 1010.

The fourth segment of 2D symbology 400 starts at connector symbol 435 and has data symbol 412 representing a 0-bit. The fourth segment continues along the remaining data symbols and ends at connector 436, which indicates the end of the fourth segment. In this example, the fourth segment represents the following portion of the binary string.

The fifth segment of 2D symbology 400 starts at connector symbol 437 and has data symbol 413 representing a 0-bit. The fifth segment continues along the remaining data symbols through data symbol 499 representing a 1-bit. The fifth segment ends at ending indicator 422, which indicates the end of the fifth segment and the end of the 2D symbology 400. In this example, the fifth segment represents the following portion of the binary string: 0001100101011.

Taken together, the first, second, third, fourth and fifth segments represent the binary string 010 1101 1010 011010100101011 0001100101011. In examples, a decoding processing system (e.g., processing system 300 of FIG. 3) may know that the segments are to be decoded in an order different than that indicated within the 2D symbology. For example, the decoding processing device may process the segments in the following order: second segment, third segment, fifth segment, first segment, and fourth segment. In this example, the binary string is: 1101 1010 0001100101011 010 011010100101011.

In additional examples, a loop symbol 450 may be designated that signals to repeat a certain segment or partial segment when being decoded. For example, loop symbol 450 may cause a sequence to be repeated. Similarly, the loop symbol may cause a series of bits (e.g., four bits) to be repeated. Loop symbol 450 may be a star, rectangle, square, or other similar symbol and may be placed at any suitable location within the 2D symbology. Multiple loop symbols may be implemented and/or a loop symbol may be defined to cause multiple loops during decoding. In one example, as illustrated in FIG. 4, loop symbol 450 (e.g., an empty start) indicates that a loop should be performed at the loop symbol 450. In examples, multiple loop symbols may be used within the 2D symbology. The loop starts with a starting loop symbol 452 (e.g., a solid star) that coincides with loop symbol 450 (e.g., the empty star). The loop ends with an ending loop symbol 454 (e.g., an empty octagon). In the example of FIG. 4, the loop represents data symbols 413, 414, 415, 416 which represent the binary sequence 0001. The loop symbol 450 can be located anywhere within the 2D symbology. To invoke the loop, the loop symbol 450 finds the starting loop symbol 452 within the 2D symbology and runs through the sequence of 0-bits and 1-bits (e.g., data symbols 413-416) until reaching ending loop symbol 454. Upon ending, the decoding resumes at the loop symbol 450.

It should be appreciate that any suitable symbols may be used, and that the symbols illustrated in FIG. 4 are merely illustrative one example of symbols that may be implemented according to aspects of the present disclosure.

Figure 5:
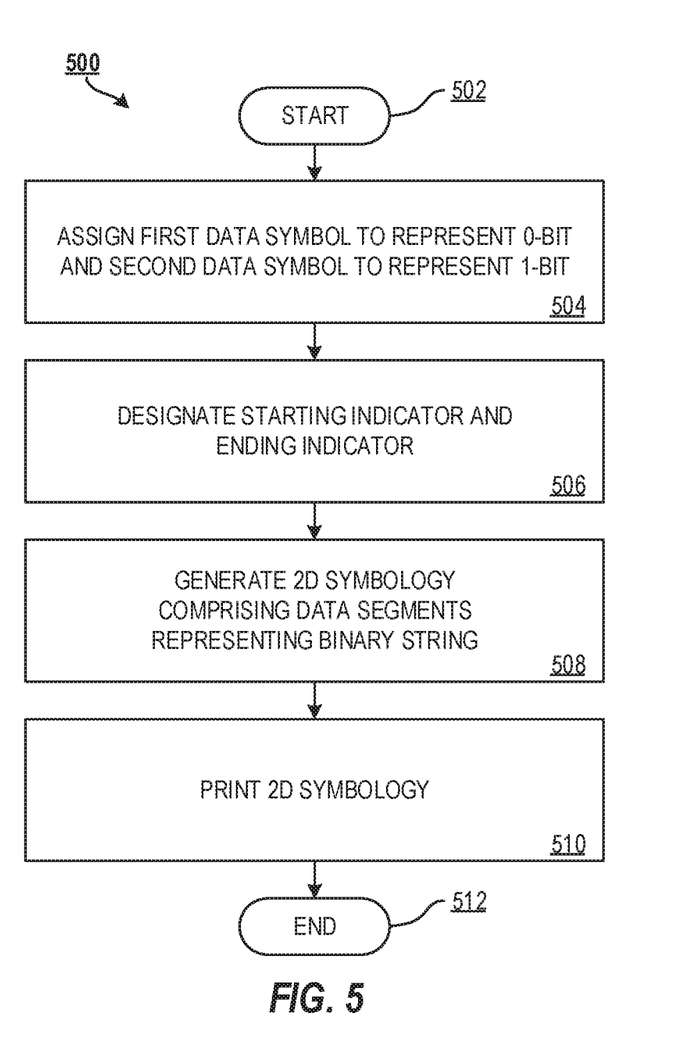
FIG. 5 illustrates a flow diagram of a method for encoding data in two-dimensional symbology according to examples of the present disclosure.

FIG. 5 illustrates a flow diagram of a method 500 for encoding data in two-dimensional symbology according to examples of the present disclosure. The method 500 begins at block 502 and continues to block 504.

At block 504, the method includes assigning a first data symbol to represent a 0-bit and assigning a second data symbol to represent a 1-bit. The first data symbol and the second data symbol each comprise a line segment. In examples, the first data symbol representative of a 0-bit is an empty circle on a line segment, and the second data symbol representative of a 1-bit is a solid circle on a line segment. In other examples, other shapes or symbols may be used, such as a triangle, square, oval, hexagon, etc.

At block 506, the method 500 includes designating a starting indicator and an ending indicator. The starting indicator may be any suitable symbol, such as an arrow, a geometric shape, or other suitable symbol. The ending indicator comprises a symbol different from the starting indicator. In an example, as illustrated in FIG. 4, an up arrow may be designated as the starting indicator and a down arrow may be designated as the ending indicator. Other configurations of starting indicators and ending indicators may be utilized. Each of the starting indicator and the ending indicator should be unique within the 2D symbology. That is, each of the starting indicator and the ending indicator should appear once within the 2D symbology.

In examples, at block 506, the method 500 may also include designating a connector pair comprising a first connector symbol and a second connector symbol. The two connector symbols indicate the ending of one segment and the start of the next segment. Connector symbols of a connector pair share a common symbol. For example, a first connector symbol, which may be a triangle, indicates the end of one segment and a second connector symbol, which is the same as the first connector symbol, indicates the start of the next segment. Multiple connector pairs, each comprising two connector symbols, may be designated in examples.

In some examples of the present disclosure, at block 506, the method 500 may also include designating an operational symbol. An operational symbol may indicate a logical functions and operations to be performed when the binary string is decoded. For example, an operational symbol may indicate that an XOR operation, an AND operation, a NOR operation, or any other suitable operation is to be performed. Additionally, the operational symbol may indicate that a mathematical operation, such as addition, subtraction, multiplication, and/or division be performed. An operational symbol may be implemented in conjunction with a connector pair, such that the connector pair indicates an operation to be performed with respect to the segments before and after the connector pair.

At block 508, the method 500 includes generating the 2D symbology. The 2D symbology comprises a series of data symbols representing a binary string. The series of data symbols are positioned in an end-to-end orientation such that an end of a line segment of one data symbol joins an end of a line segment of another data symbol. The series of data symbols start at the starting indicator and end at the ending indicator. The series of data symbols comprise 0-bit symbols represented by the first data symbol and 1-bit symbols represented by the second data symbol. In examples, the first data symbol representative of a 0-bit is an empty circle on a line segment, and the second data symbol representative of a 1-bit is a solid circle on a line segment. In aspects of the present disclosure, the data symbols may be other than empty and solid circles. For example, an empty square may represent a 0-bit and a solid square may represent a 1-bit. In another example, an empty triangle may represent a 1-bit and a solid triangle may represent a 0-bit.

In aspects of the present disclosure, the data symbols form a continuous line starting with the starting indicator and ending with the ending indicator. In examples, the continuous line is broken into segments that may be non-continuous to one another. In examples, none of the data symbols intersect with any other of the data symbols. In this way, the data symbols may form a human-recognizable layout, such as a letter, word, phrase, logo, image, symbol, or other human-recognizable layout.

At block 510, the method 500 includes printing the 2D symbology. In examples, printing the 2D symbology includes printing the 2D symbology with a printing device such that the 2D symbology is applied to an article (e.g., a piece of paper, a box, packaging materials, etc.). In other examples, printing the 2D symbology includes displaying the 2D symbology on a display device. The method 500 continues to block 512 and terminates.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
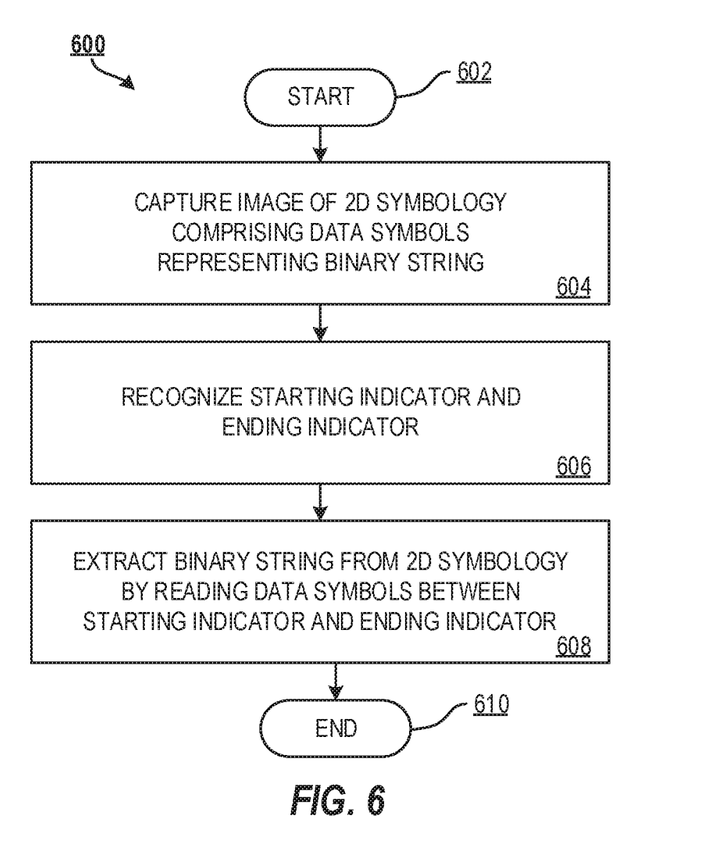
FIG. 6 illustrates a flow diagram of a method for decoding data in two-dimensional symbology according to examples of the present disclosure.

FIG. 6 illustrates a flow diagram of a method 600 for decoding data in two-dimensional symbology according to examples of the present disclosure. The method 600 begins at block 602 and continues to block 604.

At block 604, the method 600 includes capturing an image of a 2D symbology. The 2D symbology comprises a series of data symbols representing a binary string. In examples, each of the data symbols comprises a line segment. The series of data symbols are positioned in an end-to-end orientation starting at a starting indicator and ending at an ending indicator. The series of data symbols comprise 0-bit symbols represented by the first data symbol and 1-bit symbols represented by the second data symbol.

At block 606, the method 600 includes recognizing the starting indicator and the ending indicator. The method 600 may also include recognizing any operational symbols to apply as appropriate. Various configurations of starting indicators and ending indicators may be utilized as described herein.

At block 608, the method 600 includes extracting the binary string from the 2D symbology by reading each of the data symbols between the starting indicator and the ending indicator. Data symbols corresponding to a 0-bit are represented by first data symbols and data symbols corresponding to a 1-bit are second data symbols. In examples, the first data symbols corresponding to a 0-bit are empty circles on a line segment and second data symbols corresponding to a 1-bit are solid circles on a line segment. In examples, operational functions identified by any operational symbols that may be present are applied as appropriate. The method 600 continues to block 610 and terminates.

Additional processes also may be included, and it should be understood that the processes depicted in FIG. 6 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
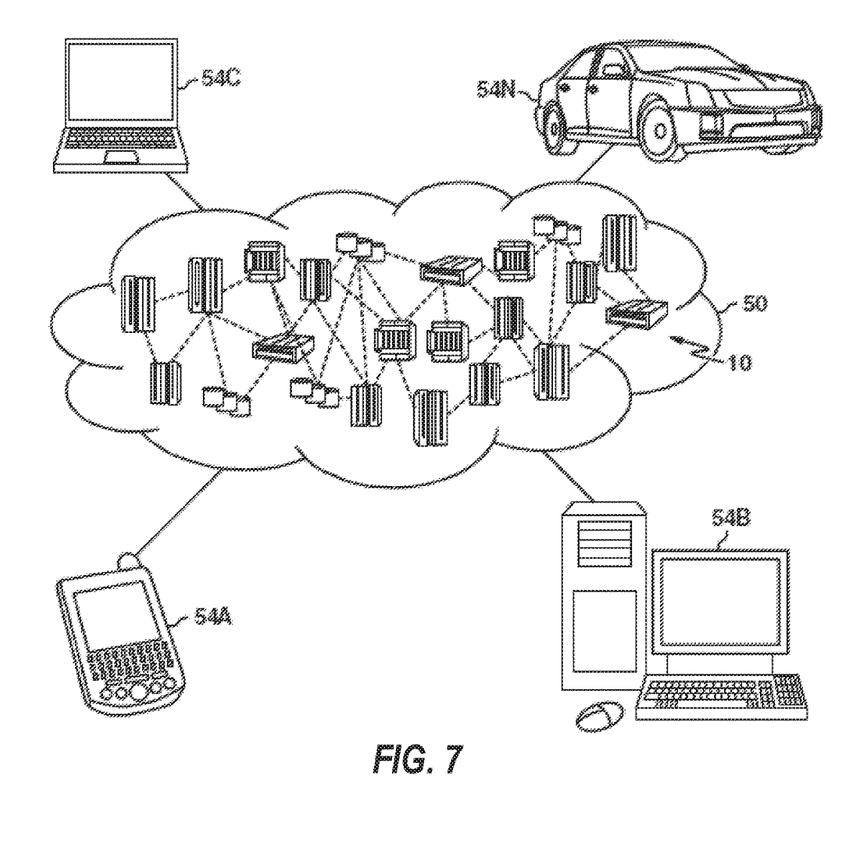
FIG. 7 illustrates a cloud computing environment according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
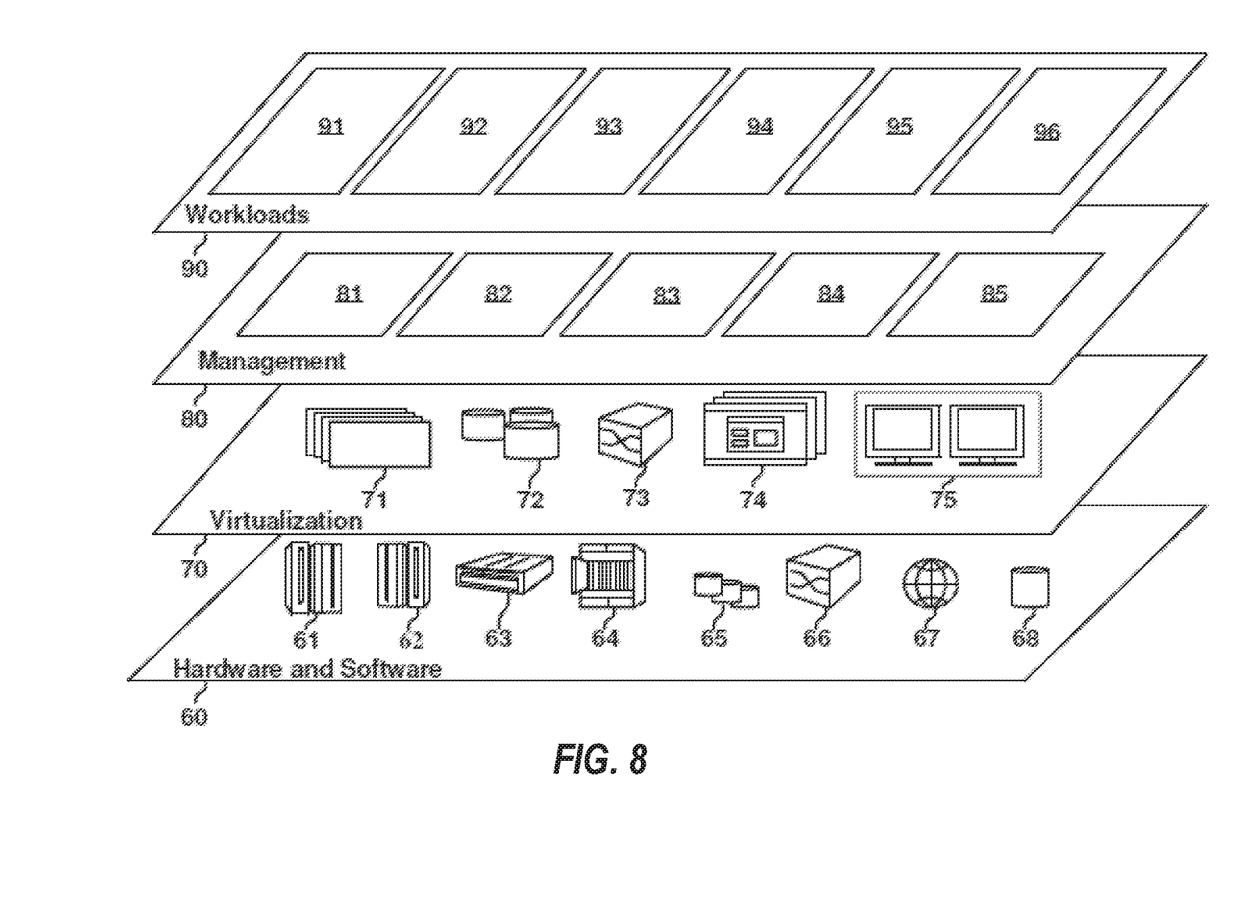
FIG. 8 illustrates abstraction model layers according to examples of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage of applications for mobile devices 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer-implemented method for encoding data in a two-dimensional (2D) symbology, the method comprising:
    assigning a first data symbol representative of a 0-bit and a second data symbol representative of a 1-bit, each of the first data symbol and the second data symbol comprising a line segment, wherein the first data symbol representative of a 0-bit is an empty circle on the line segment, and wherein the second data symbol representative of a 1-bit is a solid circle on the line segment;
    designating a starting indicator and an ending indicator; and
    generating, by a processing device, the 2D symbology, the 2D symbology comprising a series of data symbols representing a binary string, wherein each data symbol in the series of data symbols are positioned in an end-to-end orientation starting at the starting indicator and ending at the ending indicator, and wherein the series of data symbols comprise 0-bit symbols represented by the first data symbol and 1-bit symbols represented by the second data symbol.

2. The computer-implemented method of claim 1, wherein the designating further comprises designating a connector pair comprising a first connector symbol and a second connector symbol.

3. The computer-implemented method of claim 2, wherein the first connector symbol indicates the end of a first segment and the second connector symbol indicates the start of a second segment.

4. The computer-implemented method of claim 2, wherein the designating further comprises designating additional connector pairs, each of the connector pairs comprising two connector symbols, wherein the two connector symbols are the same.

5. The computer-implemented method of claim 1, further comprising printing the 2D symbology.

6. The computer-implemented method of claim 1, wherein the designating further comprises designating an operational symbol.

7. The computer-implemented method of claim 6, wherein the 2D symbology forms a human-recognizable layout.

8. A system for encoding data in a two-dimensional (2D) symbology, the system comprising:
    a processor in communication with one or more types of memory, the processor configured to:
    assign a first data symbol representative of a 0-bit and a second data symbol representative of a 1-bit, each of the first data symbol and the second data symbol comprising a line segment, wherein the first data symbol representative of a 0-bit is an empty circle on the line segment, and wherein the second data symbol representative of a 1-bit is a solid circle on the line segment,
    designate a starting indicator and an ending indicator, and
    generate the 2D symbology, the 2D symbology comprising a series of data symbols representing a binary string, wherein each data symbol in the series of data symbols are positioned in an end-to-end orientation starting at the starting indicator and ending at the ending indicator, and wherein the series of data symbols comprise 0-bit symbols represented by the first data symbol and 1-bit symbols represented by the second data symbol.

9. The system of claim 8, wherein the designating further comprises designating a connector pair comprising a first connector symbol and a second connector symbol.

10. The system of claim 9, wherein the first connector symbol indicates the end of a first segment and the second connector symbol indicates the start of a second segment.

11. The system of claim 9, wherein the designating further comprises designating additional connector pairs, each of the connector pairs comprising two connector symbols, wherein the two connector symbols are the same.

12. The system of claim 8, wherein the processor is further configured to print the 2D symbology.

13. The system of claim 8, wherein the designating further comprises designating an operational symbol.

14. The system of claim 13, wherein the 2D symbology forms a human-recognizable layout.

15. A computer program product for encoding data in a two-dimensional (2D) symbology, the computer program product comprising:
a non-transitory storage medium readable by a processing circuit and storing instructions for execution by the processing circuit for performing a method comprising:
assigning a first data symbol representative of a 0-bit and a second data symbol representative of a 1-bit, each of the first data symbol and the second data symbol comprising a line segment, wherein the first data symbol representative of a 0-bit is an empty circle on the line segment, and wherein the second data symbol representative of a 1-bit is a solid circle on the line segment,
designating a starting indicator and an ending indicator, and
generating the 2D symbology, the 2D symbology comprising a series of data symbols representing a binary string, wherein each data symbol in the series of data symbols are positioned in an end-to-end orientation starting at the starting indicator and ending at the ending indicator, and wherein the series of data symbols comprise 0-bit symbols represented by the first data symbol and 1-bit symbols represented by the second data symbol.

16. The computer program product of claim 15, wherein the designating further comprises designating a connector pair comprising a first connector symbol and a second connector symbol.

17. The computer program product of claim 16, wherein the first connector symbol indicates the end of a first segment and the second connector symbol indicates the start of a second segment.

18. The computer program product of claim 16, wherein the designating further comprises designating additional connector pairs, each of the connector pairs comprising two connector symbols, wherein the two connector symbols are the same.

* * * * *